(No Model.)
A. F. McGREW.
UNDERGROUND CONDUIT FOR ELECTRIC WIRES.
No. 257,357. Patented May 2, 1882.
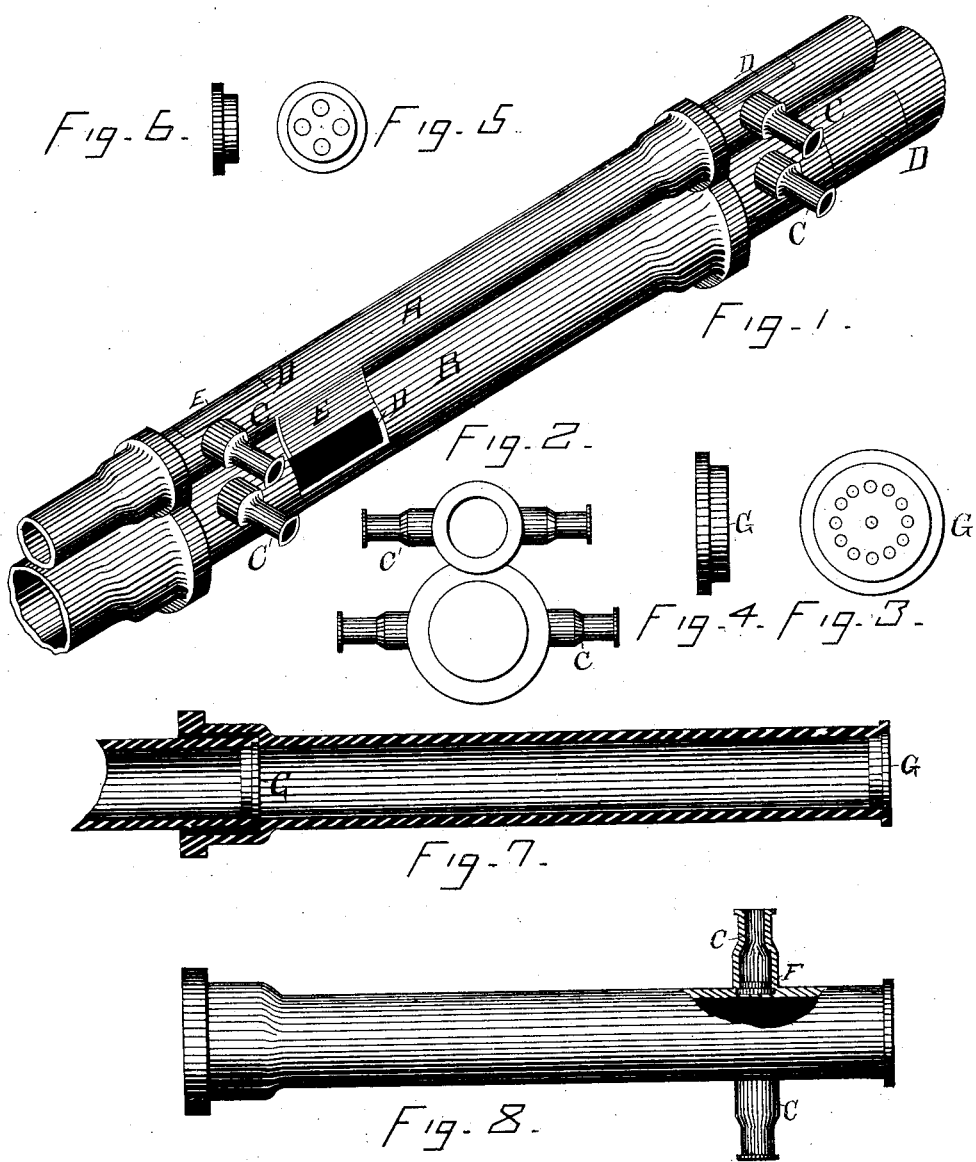
WITNESSES:
Arthur L. Church.
Louis H. Kuebler.
INVENTOR
Archie F. McGrew
by his attorney
Chas. A. Rutter

UNITED STATES PATENT OFFICE.

ARCHIE F. McGREW, OF SAN FRANCISCO, CALIFORNIA.

UNDERGROUND CONDUIT FOR ELECTRIC WIRES.

SPECIFICATION forming part of Letters Patent No. 257,357, dated May 2, 1882.

Application filed December 17, 1881. (No model.)

*To all whom it may concern:*

Be it known that I, ARCHIE F. McGREW, a citizen of the United States, and a resident of the city and county of San Francisco, and State of California, have invented a new and useful Improvement in Underground Conduits for Telegraph, Telephone, and Electric-Light Wires or Cables, of which the following is a specification.

The objects of my invention are to provide a simple, economical, and durable conduit for telegraph, telephone, and electric-light wires or cables, in which connections may readily be made between the main line and dwelling or business houses with which such connections may be required.

In the accompanying drawings, forming part of this specification, and in which similar letters of reference indicate like parts throughout the several views, Figure 1 represents a perspective view of my invention; Fig. 2, an end view of the conduits; Fig. 3, an end view of the insulator for the large pipe; Fig. 4, a side view of the same; Fig. 5, an end view of the insulator for the small pipe; Fig. 6, a side view of the same; Fig. 7, a sectional view of the large conduit, and Fig. 8 a top view of the same.

My invention relates to underground conductors for electricity; and it consists in the parts and devices and combinations of parts and devices hereinafter described and claimed.

Referring to the drawings, A and B represent the pipes or conduits, A being intended to conduct electric-light wires or cables, and B to conduct telegraph or telephone wires. Each section of the pipes or conduits is provided with offsets C, through which wires can be introduced to make connection between the main line and buildings along the route. A few inches from each offset is situated a hand-hole, D, by aid of which new wires may be inserted in the conduits, old ones rearranged or repaired, and connections made between the main line and buildings, and such other lateral connections as may be required. The hand-holes are covered with a lid or cap, E, which may be hinged or otherwise suitably fastened. The small end of each section of the conduit is cast with a recess, so as to receive the insulating-disk. This disk or insulator consists of a single solid piece of glass. Its shape is that of two short cylinders of unequal diameters and coincident axes, and it is perforated longitudinally with as many holes as there are to be electric conductors, the number being limited only by the size of the disk.

Figs. 3 and 4 show an end and side view of an insulator for the large or telegraphic conduit, and Figs. 5 and 6 an end and side view of the same for the small or electric-light conduit. The offsets are likewise provided with a similar insulator, F, Fig. 8. In Fig. 7 is shown a section of a conduit, G G being the insulators.

Having thus described my invention, I claim and desire to secure by Letters Patent—

In an underground conduit for electric wires, the combination of the pipe A, having an enlarged end, as described, to receive the smaller end of a corresponding pipe, with such corresponding pipe and disk G, provided with apertures for the passage of telegraph or other electric conducting wires, and having an enlarged portion or shoulder constructed to fit the interior of the enlarged portion of pipe A, and a smaller portion constructed to fit the interior of the smaller end of the connecting-pipe, substantially as and for the purpose set forth.

ARCHIE F. McGREW.

Witnesses:
CHAS. A. RUTTER,
OTIS EGAN.